Feb. 4, 1964   E. B. DICKISON ETAL   3,120,307
ARTICLE GAUGING AND SORTING APPARATUS
Filed May 4, 1961   5 Sheets-Sheet 1

INVENTORS
E. B. DICKISON
W. C. GRAVES
K. R. LAGLER
R. E. PURDY
BY *P. Gundersen*
ATTORNEY

FIG. 3

INVENTORS
E.B. DICKISON
W.C. GRAVES
K.R. LAGLER
R.E. PURDY
BY /. Gundersen
ATTORNEY

INVENTORS
E.B. DICKISON
W.C. GRAVES
K.R. LAGLER
R.E. PURDY
BY /S. Gundersen
ATTORNEY

INVENTORS
E.B. DICKISON
W.C. GRAVES
K.R. LAGLER
R.E. PURDY
BY
ATTORNEY

Feb. 4, 1964    E. B. DICKISON ETAL    3,120,307
ARTICLE GAUGING AND SORTING APPARATUS
Filed May 4, 1961    5 Sheets-Sheet 5

INVENTORS
E. B. DICKISON
W. C. GRAVES
K. R. LAGLER
R. E. PURDY
BY S. Gundersen
ATTORNEY United States Patent Office 3,120,307
Patented Feb. 4, 1964

3,120,307
ARTICLE GAUGING AND SORTING APPARATUS
Earl B. Dickison, William C. Graves, and Karl R. Lagler, Indianapolis, and Ralph E. Purdy, Lawrence, Ind., assignors to Western Electric Company, Incorporated, New York, N.Y., a corporation of New York
Filed May 4, 1961, Ser. No. 115,067
13 Claims. (Cl. 209—88)

This invention relates to article gauging and sorting apparatus and more particularly to apparatus for gauging desired outside dimensions of articles and for automatically grading the articles in accordance with the measured dimensions.

In the manufacture of telephone receivers, it is necessary to form receiver magnets having predetermined dimensions with close tolerances to insure substantially perfect mating of the receiver magnets with other parts of the receiver. To satisfy these requirements, the dimensions of the receiver magnets must be closely checked and controlled during the manufacture to insure that required tolerances are met. Accordingly, there is a need to provide an apparatus for gauging the critical dimensions of the receiving magnets and for automatically grading the articles in accordance with the measured dimensions.

An object of the invention is to provide new and improved article gauging apparatus.

Another object of the invention is to provide new and improved apparatus for gauging desired dimensions of articles and for automatically grading the gauged articles in accordance with the gauged dimensions.

A further object of the invention is to provide improved means for feeding an article into a desired position and for stripping the article off the feeding means.

Gauging and sorting apparatus embodying certain features of the present invention utilizes a gauging head having a plurality of movable gauging means for measuring desired dimensions of an article supported and oriented in a desired gauging position on support means, the individual gauging means being movable relative to the support means proportionally to the magnitude of the measurements of the dimensions of the article. The individual gauging means, in accordance with various degrees of magnitude of the movement of the gauging means, actuate various associated switch means which cooperate with each other for energizing means for indicating whether the dimensions of the article are within or without limits.

According to an important feature of the invention, a pusher is reciprocably movable relative to the gauging head to carry an article to be gauged into engagement with the support means and the gauging means. The gauged article is then removed from the pusher by a stripper mounted for limited slidable movement relative to the pusher, the pusher engaging the stripper operably during at least a portion of the reciprocable movement of the pusher for causing corresponding movement of the stripper with the pusher. The stripper is resistively detained or arrested during a portion of a retract stroke of the pusher to allow limited slidable movement of the pusher relative to the stripper while the stripper prevents the article from being retracted with the pusher thereby stripping the article off the pusher.

Other objects and aspects of the present invention will become more readily understood from the following detailed description of a specific embodiment thereof when read in conjunction with the appended drawings, in which:

Figure 1:
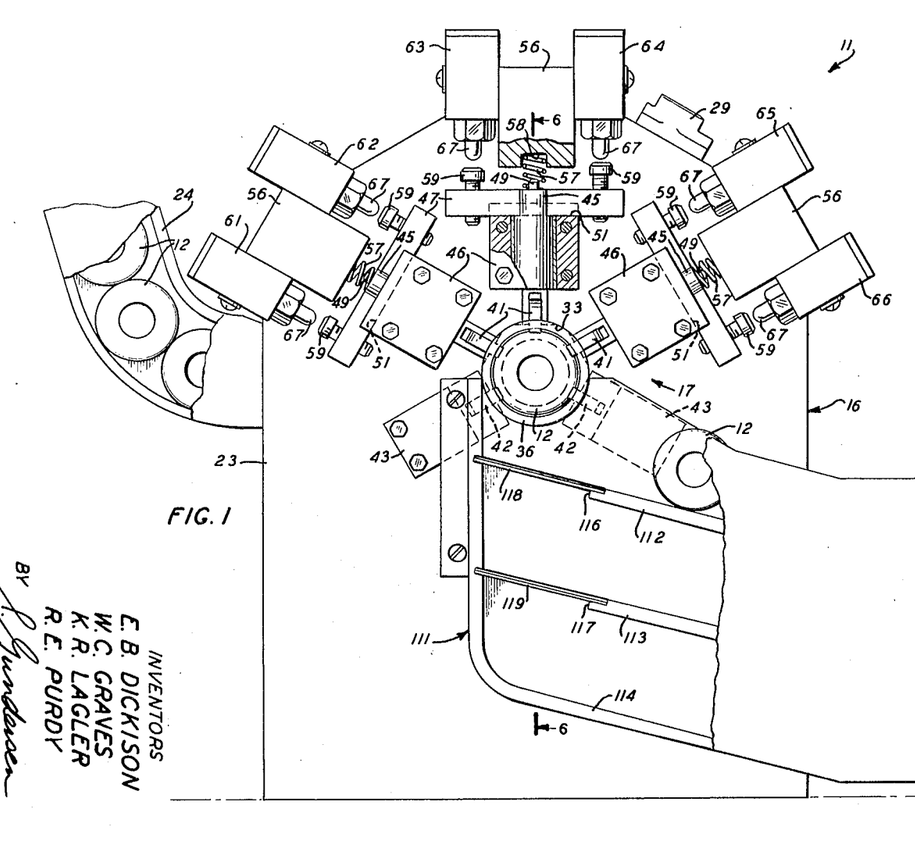
FIG. 1 is a front elevational view of apparatus embodying the invention, with parts thereof broken away for clarity.
Figure 2:
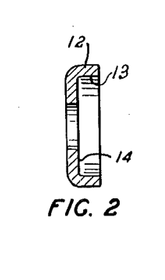
FIG. 2 is a sectional side view of a receiver magnet to be gauged.

Referring in detail to the drawings, and more particularly to FIG. 1 thereof, there is shown gauging and grading apparatus, designated generally by the numeral 11, for gauging the dimensions of articles and for grading the gauged articles into different grades in accordance with the measured dimensions. In the exemplary embodiment illustrated, the apparatus 11 is designed to gauge the outside diameter of cylindrical reeciver magnets 12—12, one of which is shown in FIG. 2, having a bore 13 and a bottom 14.

The receiver magnets 12—12 are gauged by the apparatus 11 to determine whether the outside diameter of each of the gauged receiver magnets satisfies the predetermined tolerance conditions of a receiver magnet taken as a standard. The gauged receiver magnets 12—12 are then sorted into grades, in this particular example into three grades: a regular, an "oversize," and an "undersize." The regular grade is designed to include all of the receiver magnets 12—12, the outside diameter of which falls within the tolerance limits of an outside diameter of a receiver magnet taken as a standard. The oversize grade is designed to include all of the receiver magnets 12—12, the outside diameter of which is greater than the maximum acceptable outside diameter of the receiver magnets falling within the regular grade. The undersize grade is designed to include all of the receiver magnets 12—12, the outside diameter of which is less than the minimum acceptable outside diameter of the receiver magnets falling within the regular grade.

The apparatus 11 includes a frame, designated generally by the numeral 16, a gauging mechanism, designated generally by the numeral 17, a pusher mechanism (FIG. 3), designated generally by the numeral 18, and a grading mechanism (FIG. 6), designated generally by the numeral 19. The frame 16 includes generally a floor plate 21 mounted upon supports 22—22 (FIG. 3), and a front plate 23 mounted transverse to the floor plate. A delivery chute 24, which is mounted to both the floor plate 21 and the front plate 23, is provided for delivering a series of receiver magnets 12—12, stacked in the delivery chute on their sides in a row, into a gauging position. The delivery chute 24 is provided with a track 26 (FIG. 4), an end portion 27 of which is bent upwardly.

A detector arm 28 (FIG. 4) of a normally open detector switch 29 is positioned in a path of receiver magnets 12—12 being delivered by the delivery chute 24 toward the end portion 27 of the track 26. Movement of the detector arm 28 from its normal position, shown in phantom lines in FIG. 4, to its operating, detecting position, shown in solid lines in FIG. 4, results in the closing of the detector switch 29. The detector switch 29 is provided to detect the presence of a receiver magnet 12 to be gauged in a gauging position and to initiate, upon actuation, the gauging operation. An adjustable, threaded stop member 31 is mounted threadedly through the end portion 27 of the track 26. The stop member 31 is provided to stop the receiver magnets 12—12 in a proper gauging position. The stop member 31 is so adjusted that, when the detector arm 28 is in its depressed, detecting position, the receiver magnet 12 to be gauged is aligned with an aperture 33 in the front plate 23.

Figure 5:
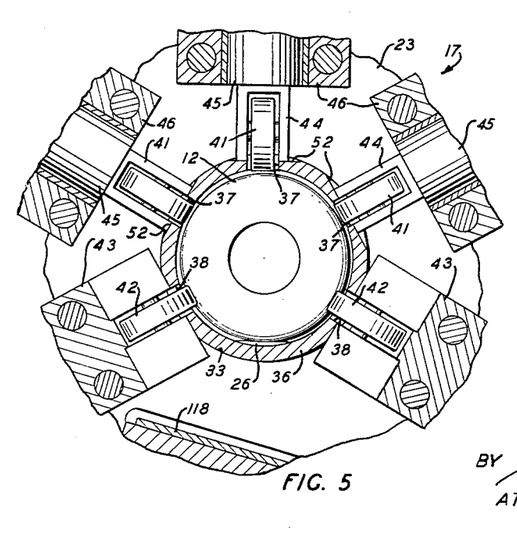
FIG. 5 is an enlarged, fragmental, sectional view of the apparatus of FIG. 1.

A tubular gauging channel 36 is mounted to the front plate 23 axially of the aperture 33. As shown in FIG. 5, the channel 36 is provided with five circumferentially spaced, radially arranged, elongated apertures 37—37 and 38—38, the long axes of which are parallel to the longitudinal axis of the channel. The apertures 37—37 are spaced circumferentially equidistant from each other and from the apertures 38—38, while the apertures 38—38 are spaced from each other circumferentially a distance twice the distance between the apertures 37—37.

A plurality of rollers 41—41 and 42—42 are disposed individually in the apertures 37—37 and 38—38, respectively, radially of the channel. The rollers 42—42 are mounted individually and rotatably in mounting blocks 43—43, which are mounted securely to the front plate 23 in a predetermined permanent relationship to the central axis of the channel 36. The rollers 42—42 extend through the apertures 38—38 beyond the inner surface of the channel 36, radially of the longitudinal axis thereof, so as to form a V-shaped support for the receiver magnets 12—12 to be gauged.

The rollers 41—41 are mounted individually and rotatably in forked end portions 44—44 of movable slides 45—45, radially of the longitudinal axis of the channel 36. The slides 45—45 are mounted slidably in mounting blocks 46—46, which are secured to the front plate 23. Each of the slides 45—45 carries one of the bars 47—47, mounted securely in associated recesses 48—48 (FIGS. 6, 7, 8) in the slides by means of bolts 49—49. The bars 47—47 are also disposed slidably in guide recesses 51—51 in the mounting blocks 46—46.

The outside surface of the channel 36 is provided with elongated recesses 52—52 (FIG. 5), arranged transversely of the apertures 38—38. The forked end portions 44—44 of the slides 45—45 normally contact bottom surfaces of the associated ones of the recesses 52—52 to provide a lower limit of movement for the slides 44—44 and, therefore, the rollers 41—41 inwardly of the channel 36 relative to the longitudinal axis thereof.

A plurality of bracket blocks 56—56 are mounted individually on the front plate 23 axially of the associated mounting blocks 46—46. Compression springs 57—57 are mounted individually in the associated ones of the recesses 58—58 in the bracket blocks 56—56 and about the associated ones of the bolts 49—49. The springs 57—57 normally urge the end portions 44—44 of the slides 45—45 in contact with the bottom surfaces of the recesses 52—52, so that the rollers 41—41 are urged into their normal positions, shown in FIGS. 1 and 6. The normal position of the rollers 41—41, relative to the longitudinal axis of the channel 36, is so selected that when a receiver magnet 12, being gauged and having an outside diameter equal, at least, to the minimum acceptable outside diameter of receiver magnets included in the regular grade, is advanced between the rollers 41—41 and 42—42, the rollers 41—41 move, at least, a predetermined distance radially outwardly of the channel 36.

Actuators 59—59 are mounted in pairs in the bars 47—47. Normally open limit switches 61, 63 and 65 and normally closed limit switches 62, 64 and 66, having plungers 67—67, are mounted in pairs to the associated ones of the bracket blocks 56—56. The actuators 59—59 are so adjusted as to actuate the associated ones of the plungers 67—67 of the limit switches 61 to 66, inclusive, to close the normally open limit switches 61, 63 and 65 when the outside diameter of a receiver magnet 12 being gauged is equal to or greater than the minimum acceptable outside diameter of receiver magnets included in the regular grade, and to open the normally closed limit switches 62, 64 and 66 when the outside diameter of a receiver magnet 12 being gauged is greater than the maximum acceptable outside diameter of receiver magnets included in the regular grade.

Figure 6:
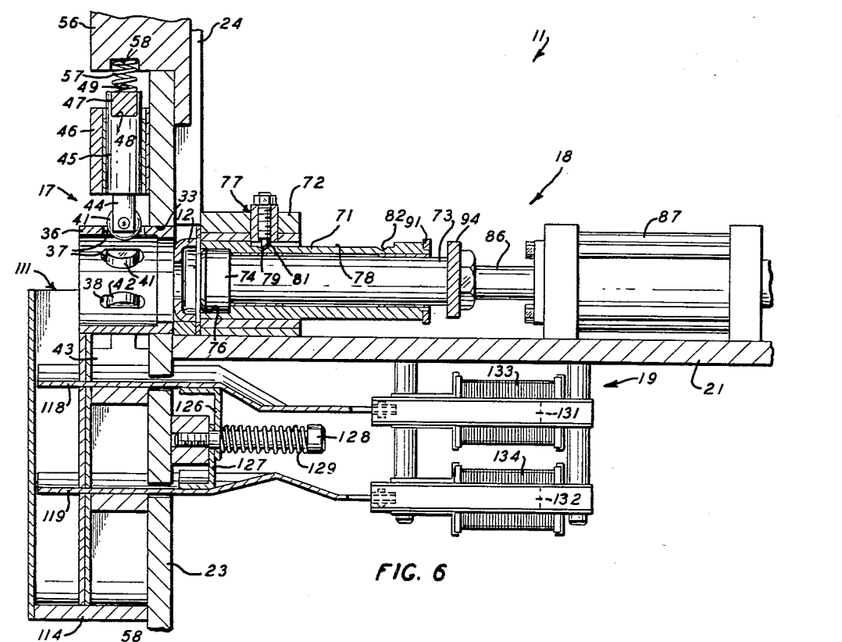
FIG. 6 is a sectional side elevation of the apparatus shown in FIG. 1, taken along the line 6—6, with parts thereof broken away for clarity.
Figure 7:
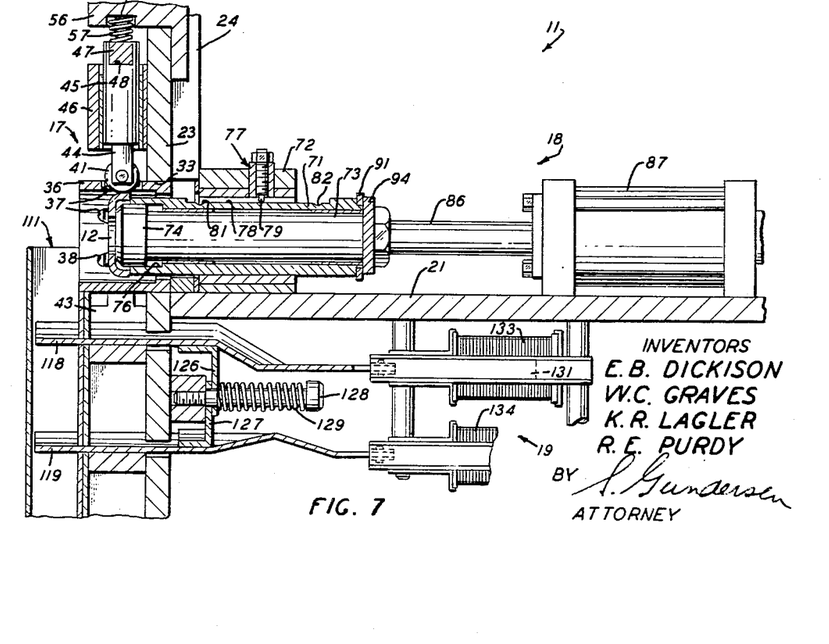
FIG. 7 is a view of the apparatus shown in FIG. 6, with parts thereof shown in a different gauging position.

The pusher mechanism 18, as viewed in FIGS. 3, 6, 7, and 8, is mounted axially of the aperture 33 and the channel 36. The pusher mechanism 18 includes a cylindrical sleeve 71, which is mounted slidably in a bearing 72 secured to the floor plate 21. A stepped cylindrical pusher 73 is mounted slidably within the sleeve 71 for reciprocable movement axially of the channel 36 and transverse to the gauging mechanism 17. The pusher 73 is provided with a head 74, which is received normally within a counterbore 76 in the sleeve 71. During the gauging operation, the head 74 is positioned relatively loosely within the bore 13 of a receiver magnet 12, to be gauged, in contact with the bottom 14, as is shown in FIG. 7.

A sleeve detainer, designated generally by the numeral 77, is mounted in the bearing 72 in alignment with an elongated flat 78 of the sleeve 71. The sleeve detainer 77 is provided with a pin 79, which is spring-biased outwardly thereof toward the sleeve 71. Notches 81 and 82 are provided individually at opposite ends of the flat 78. The pin 79 is provided to enter alternatively the notches 81 and 82 to detain or arrest the sleeve 71 in a desired position relative to the bearing 72, depending on which one of the notches 81 and 82 is engaged by the pin 79.

The pusher 73 is secured to a piston rod 86 of a double-action fluid cylinder 87 mounted on the floor plate 21 axially of the pusher. The fluid cylinder 87 is controlled by a solenoid-operated control valve 88 (FIG. 3) which is connected to a suitable source (not shown) of fluid, such as air. The fluid cylinder 87 is designed to move the piston rod 86 to carry the pusher 73 between the normal position thereof shown in FIGS. 3 and 6 and a discharge position thereof shown in solid lines in FIG. 8.

An L-shaped arm 91 (FIG. 3) is mounted on the sleeve 71 for movement therewith. The arm 91 is designed to actuate a roller plunger 92 of a normally open limit switch 93 to close the latter, after the pusher 73 moves a receiver magnet 12 being gauged past a gauging position thereof shown in FIG. 7 but before the head 74 of the pusher reaches the discharge position, to initiate operation of the grading mechanism 19.

Figure 8:
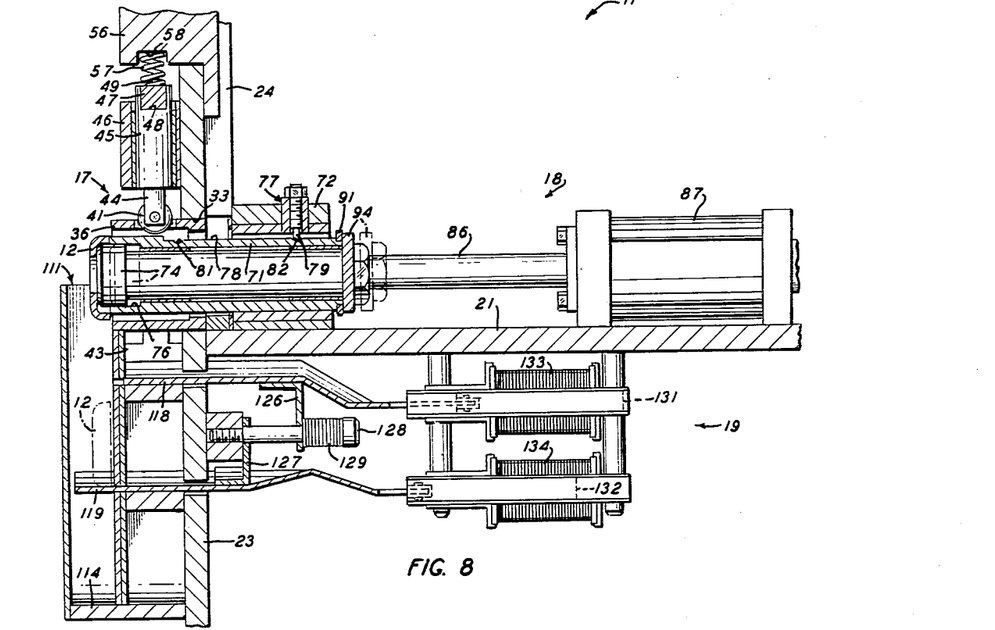
FIG. 8 is a view of the apparatus shown in FIG. 6, with parts thereof shown in still a different operating position.

A trip arm 94 is mounted on the piston rod 86 adjacent to the pusher 73 for reciprocable movement therewith. A pair of adjustable lugs 96 and 97 are mounted threadably in the trip arm 94. The lug 96 is mounted axially of a plunger 98 of a normally open limit switch 99. The lug 96 is adjusted to actuate the plunger 98 at the end of the movement of the piston rod 86 from left to right, as viewed in FIGS. 3 and 8, into its normal position shown in FIGS. 3 and 6, i.e. at the end of a retract stroke of the piston rod 86. Upon actuation, the plunger 98 closes the limit switch 99 to energize a coil of an advance solenoid 101 (FIG. 9) of the valve 88 to cause movement of the piston rod 86 and the pusher 73 from the normal position thereof toward the operating positions, such as are shown in FIGS. 7 and 8.

The lug 97 is mounted axially of a plunger 102 of a normally open limit switch 103. The lug 97 is adjusted to actuate the plunger 102 at the end of the movement of the pusher 73 from right to left, as viewed in FIGS. 3 and 6, into the discharge position, i.e. at the end of the advance stroke of the piston rod 86. Upon actuation, the plunger 102 closes the limit switch 103 to energize a coil of a retract solenoid 104 (FIG. 9) of the valve 88 to cause movement of the piston rod 86 and the pusher 73 from the discharging position toward the normal position thereof. The trip arm 94 is also designed to actuate momentarily during the advance stroke of the piston rod 86 a one-way roller arm 106 of a single-pole, double-throw limit switch 107. The operation and purpose of the limit switch 107 is described with respect to operation of the apparatus.

The grading mechanism 19 includes a discharge chute, designated generally by the numeral 11, provided with three inclined, spaced tracks 112 to 114, inclusive (FIG. 1). The tracks 112 and 113 are arranged to provide aligned traps 116 and 117 which are arranged directly under the discharge end of the channel 36. A pair of gates 118 and 119 are mounted individually slidably transverse of the discharge chute 111 to selectively close the traps 116 and 117. The gates 118 and 119 and the tracks 112 and 113 divide the discharge chute 111 into three chutes.

Brackets 126 and 127 (FIG. 6) are mounted securely to the gates 118 and 119, respectively, and slidably upon a rod 128. A spring 129 biases the brackets 126 and 127, and, therefore, the gates 118 and 119, respectively, into a normal position shown in FIG. 6. The brackets 126 and 127 are so arranged relative to each other as to allow movement of the gate 118 from its normal position shown in FIG. 5 to its withdrawn position shown in FIG. 8 independently of the gate 119. However, movement of the gate 119 from its normal position shown in FIG. 5 will also cause corresponding movement of the gate 118.

The gates 118 and 119 are also connected individually to cores 131 and 132 of solenoids 133 and 134, respectively, mounted beneath the floor plate 21. The solenoids 133 and 134, upon energization of respective coils thereof, cause either the gate 118 or both gates 118 and 119, depending on whether only the coil of the solenoid 133 is energized or whether the coils of both of the solenoids 133 and 134 are energized, to move from the normal positions thereof to allow the receiver magnets 12—12, being gauged, to be discharged onto either the track 113 or the track 114, respectively. The tracks 112, 113 and 114 are designed to receive individually all of the receiver magnets 12—12 falling into regular, oversize and undersize grades, respectively, and to guide these receiver magnets individually to a respective one of tote boxes (not shown) associated individually with the respective tracks therewith.

Figure 9:
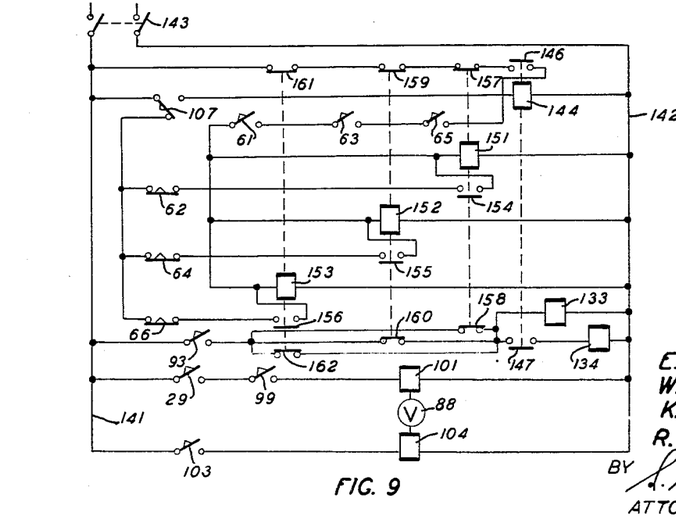
FIG. 9 is a schematic diagram of an electrical control circuit for the apparatus shown in FIG. 1.

Referring now to FIG. 9, there is shown a schematic diagram for the electrical control circuit for the apparatus 11. The operation of the control circuit will be described with respect to the operation of the apparatus.

The control circuit includes bus-lines 141 and 142 connected through a main switch 143 to a suitable source of electricity, such as 110 v., A.C. A relay 144 is provided with normally open contacts 146 and 147. Relays 151, 152 and 153 are provided with normally open contacts 154, 155 and 156, respectively, and with pairs of normally closed contacts 157 and 158, 159 and 160, 161 and 162, respectively. The relays 144, 151, 152 and 153 close their respective normally open contacts and open their respective normally closed contacts by pulling the associated contact toward the relays.

A coil of the relay 144 is connected to the bus-line 141 through a normally open contact of the limit switch 107, and to the bus-line 142 directly. The coil of the relay 144 is connected alternatively to the bus-line 141 through the contacts 146, 157, 159 and 161. Coils of the relays 151, 152 and 153 are connected to the bus-line 142 directly and to the bus-line 141 first through the normally open limit switches 61, 63 and 65 and then either through the normally open contact of the limit switch 107 or through the contacts 146, 157, 159 and 161. Alternatively the coils of the relays 151, 152 and 153 are connected to the bus-line 141 first through the normally closed contact of the limit switch 107 and then through the normally open contact 154 and the normally closed limit switch 62, through the normally open contact 155 and the normally closed limit switch 64, and the normally open contact 156 and the normally closed limit switch 66, respectively.

The coils of the solenoids 133 and 134 are connected to the bus-lines 141 and 142 through the normally closed contacts 158, 160 and 162 and the normally open limit switch 93. The coil of the solenoid 134 is connected additionally to the bus-line 141 through the normally open contact 147 of the relay 144. The coil of the advance solenoid 101 of the valve 88 is connected to the bus-lines 141 and 142 through the normally open detector switch 29 and the normally open limit switch 99. The coil of the retract solenoid 104 is connected to the bus-lines 141 and 142 through the normally open limit switch 103.

*Operation*

It is assumed that at the beginning of the operation of the above-described apparatus 11, the main switch 143 is closed and the various parts of the apparatus are in their normal positions. Therefore, the piston rod 86, the pusher 73 and the sleeve 71 are in their normal positions shown in FIGS. 3 and 6, whereat the pin 79 of the retainer 77 is in engagement with the notch 81. The lug 96 maintains the plunger 98 in a depressed position so that the limit switch 99 is closed. The gates 118 and 119 and the associated parts are also in their normal positions, so that the traps 116 and 117 are closed. The forked end portions 44—44 of the slides 45—45 are in contact with the bottom surfaces of the recesses 52—52 of the channel 36, so that the rollers 42—42 are in their normal positions.

To begin a gauging operation, a plurality of the receiver magnets 12—12 to be gauged are positioned in the delivery chute 24 so that the bore 13 of each one of the receiver magnets 12—12 faces away from the front plate 23. The foremost of the receiver magnets 12—12 stacked in the delivery chute 24, as viewed in FIG. 4, depresses the detector arm 28 of the detector switch 29 against the stop member 31. In this position, the foremost receiver magnet 12 is substantially axially aligned with the pusher 73 of the pusher mechanism 18. The depression of the detector arm 28 by the foremost receiver magnet 12 results in closing of the detector switch 29, whereby the circuit of the coil of the advance solenoid 101 is completed.

Figure 3:
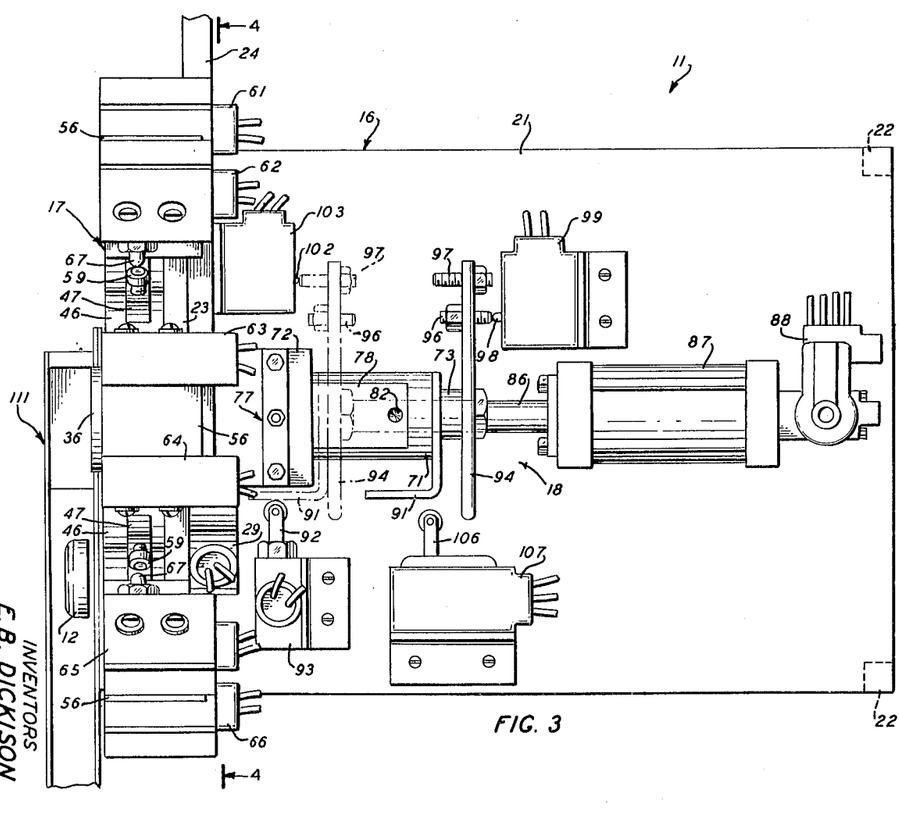
FIG. 3 is a top plan view of the apparatus shown in FIG. 1, with parts thereof broken away for clarity.
Figure 4:
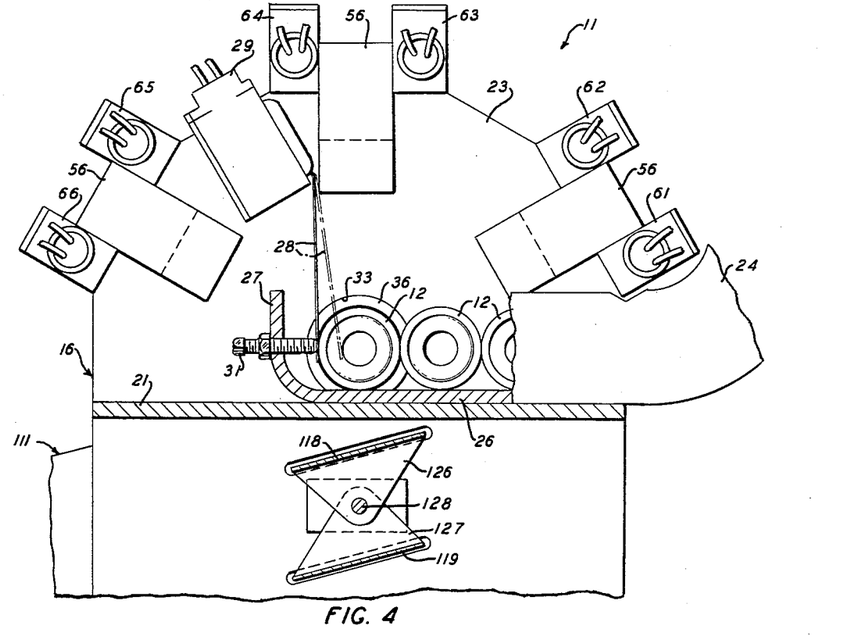
FIG. 4 is a sectional rear elevation of the apparatus shown in FIG. 3, taken along the line 4—4, with parts thereof broken away for clarity.

The energization of the coil of the advance solenoid 101 results in actuation of the control valve 88, which produces advancement of the piston rod 86 and, therefore, advancement of the pusher 73 from right to left, as viewed in FIGS. 3 and 6, i.e., from the normal position thereof through the gauging position to the discharging position thereof. As the pusher 73 moves from right to left, the head 74 of the pusher 73 exits from the counterbore 76 of the sleeve 71 being detained at this time stationary by the cooperation between the pin 79 and the notch 81, and enters the bore 13 of the receiver magnet 12 to be gauged. At the time when the head 74 of the pusher 73 contacts the bottom 14 of the receiver magnet 12 to be gauged, the trip arm 94 comes in contact with the L-shaped arm 91 mounted on the sleeve 71. Any further leftward movement of the piston rod 86, and, therefore, the pusher 73, as viewed in FIGS. 3 and 5, results in the movement of the receiver magnet 12 being pushed through the channel 36 toward the rollers 41—41 and 42—42. Simultaneously, the trip arm 94 exerts sufficient pressure on the sleeve 71 to overcome the sleeve-detaining action of the spring-biased pin 79 in the notch 81, so that the sleeve 71 begins to move leftward with the pusher 73.

During the advancement of the pusher 73 from the normal position thereof toward the gauging position, the trip arm momentarily actuates the one-way roller arm 106 of the limit switch 107 to momentarily open the normally closed contact of the limit switch 107 and to momentarily close the normally open contact thereof. Opening of the normally closed contact of the limit switch 107 results in an interrupted circuit of the coils of the relays 151, 152 and 153 so that, if any of these relays have been previously locked-in through the normally open contacts 154, 155 and 156, respectively, the coils of the relays 151, 152 and 153 will now be deenergized and the associated ones of the contacts 154 to 162, inclusive, reset to their normal positions. Closing of the normally open contact of the limit switch 107 results in energization of the coil of the relay 144. The relay 144 then closes the normally open contacts 146 and 147 thereof, so that the relay 144 remains energized after the normally open contact of the limit switch 107 is reopened again until any one of the normally closed contacts 157, 159 and 161 is opened.

As the pusher 73 advances through the channel 36, the pusher 73 forces the receiver magnet 12 being gauged in engagement with the movable rollers 41—41 and the fixed rollers 42—42, so that the receiver magnet 12 being gauged is supported on the rollers 42—42 and the rollers 41—41 move radially of the longitudinal axis of the channel 36 distances determined by the outside diameter of the receiver magnet being gauged. The radially moved rollers 41—41 move the slides 45—45 axially of the mounting blocks 46—46 and radially away from the longitudinal axis of the channel 36 against the biasing action of the associated springs 57—57. The slides 45—45 carry the bars 47—47 and, therefore, the actuators 59—59 toward the associated ones of the plungers 67—67 of the limit switches 61 to 66, inclusive.

At this time, it is assumed that the first of the receiver magnets 12—12 to be gauged is of a proper acceptable size, i.e., that the outside diameter of this receiver magnet is equal to or greater than the minimum acceptable outside diameter or equal to or less than the maximum acceptable outside diameter of the receiver magnets 12—12 included in the regular grade. Since the actuators 59—59 are preset to actuate the plungers 67—67, associated with the limit switches 61, 63 and 65 to close these switches only when the outside diameter of a receiver magnet 12 being gauged is equal to or greater than the minimum acceptable outside diameter thereof and to actuate the plungers 67—67, associated with the limit switches 62, 64 and 66, to open these switches only when the outside diameter of a receiver magnet 12 being gauged is greater than the maximum acceptable outside diameter thereof, the first receiver magnet, upon being pushed between the rollers 41—41 and 42—42, causes closing of the limit switches 61, 63 and 65 only.

Since the contact 146 of the relay 144 is closed at this time, the limit switches 61, 63 and 65 complete circuits of the coils of the relays 151, 152 and 153. The energization of the coils of the relays 151, 152 and 153 results in closing of the normally open contacts 154, 155 and 156, thereof, respectively, and opening of the normally closed contacts 157 and 158, 159 and 160, and 161 and 162, thereof, respectively. The now closed contacts 154, 155 and 156 complete alternate circuits of the coils of the relays 151, 152 and 153, through the normally closed limit switches 62, 64 and 66, respectively, and the now reclosed normally closed contact of the limit switch 107, to maintain the coils of these relays energized until the circuits thereof are interrupted through opening of either the limit switches 62, 64 and 66 or of the normally closed contact of the limit switch 107. Opening of the normally closed contacts 157, 159 and 161 results in deenergization of the relay 144 and opening of the normally open contacts 146 and 147 thereof, so that the circuit of the coil of the solenoid 134 is interrupted and remains interrupted during the continuation of the gauging operation of the first receiver magnet 12.

During the continuation of the advancement of the pusher 73, carrying the first receiver magnet 12 from the gauging position to the discharge end of the channel 36, the L-shaped arm 91 engages the roller plunger 92 of the limit switch 93 to close the latter so as to tend to complete the circuit of the coils of the solenoids 133 and 134. However, because the coils of the relays 151, 152 and 153 are energized, the contacts 158, 160 and 162 thereof, respectively, are open, and, therefore, the circuit of the coils of the solenoids 133 and 134 remains incomplete so that the gates 118 and 119 remain in their normal positions shown in FIG. 6 to maintain the traps 116 and 117 closed.

As the pusher 73 brings the first receiver magnet 12 to the discharge position over the discharge chute 111, the lug 97 actuates the plunger 102 of the limit switch 103. Actuation of the plunger 102 results in closing of the limit switch 103 and completion of the circuit of the coil of the retract solenoid 104 of the valve 88. As a result, the pusher 73 is being retracted and tends to retract the sleeve 71 therewith. Since, at this time, the pin 79 is in contact with the notch 82 of the sleeve 71, the pin tends to retain the sleeve stationary during the retract stroke of the piston rod 86. As the head 74 moves back into the counterbore 76 in the sleeve 71, the sleeve prevents the gauged receiver magnet 12 from being retracted with the pusher 73 so that the receiver magnet is stripped off the head and falls downwardly into the discharge chute 111. Since the gates 118 and 119 are closed, the stripped receiver magnet 12 falls upon the gate 118 and then rolls down the track 112 designed to guide the gauged receiver magnets 12—12, the outside diameter of which falls within the limits of the regular grade, to a tote box (not shown) associated with the track 112.

The pusher 73 then continues to move backward into the counterbore 76 of the sleeve 71 and to carry the sleeve against the retaining action of the pin 79 so that the pin is disengaged from the notch 82 and the L-shaped arm 91 releases the roller plunger 92 of the limit switch 93 whereby the circuit of the coils of the solenoids 133 and 134 is interrupted again. The pusher 73 then continues to retract the sleeve 71 back to its normal position whereat the pin 79 enters the notch 81, and the lug 96 actuates the plunger 98 of the limit switch 99. The actuated plunger 98 again closes the limit switch 99. Since, at this time, the detector arm 28 of the detector switch 29 is depressed again by a second receiver magnet 12 to be gauged, the circuit of the coil of the advance solenoid 101 is completed so that the air cylinder 87 causes again the advancement of the piston rod 86.

Now it is assumed that the outside diameter of the second receiver magnet 12 to be gauged is greater than the maximum acceptable outside diameter of the receiver magnets 12—12 included in the regular grade, i.e., that the second receiver magnet 12 is oversize. As the piston rod 86 advances, the pin 79, in engagement with the switch 81, again detains the sleeve 71 in its normal position. Therefore, the head 74 of the pusher 73 again moves out of the counterbore 76 in the sleeve 71 and enters the bore 13 of the second receiver magnet 12 being gauged. Further, advancement of the pusher 73 causes advancement of the sleeve 71 in the manner described hereinabove with respect to the first receiver magnet 12.

As the second receiver magnet 12 is carried by the pusher 73 between the rollers 41—41 and 42—42, the rollers 41—41, because of the size of the outside diameter of the second receiver magnet 12, move radially of the longitudinal axis of the channel 36 distances sufficient to cause closing of the limit switches 61, 63 and 65 and opening of the limit switches 62, 64 and 66. Closing of the limit switches 61, 63 and 65 results in energization of the coils of the relays 151, 152 and 153 and, therefore, in the closing of the contacts 154 to 156, inclusive, and opening of the contacts 157 and 158, 159 and 160, and 161 and 162, respectively. Opening of the contacts 157, 159 and 161 causes deenergization of the coil of the relay 144 and opening of the previously closed normally open contacts 146 and 147 thereof, so that the circuits of the coil of the relay 144 and the coil of the solenoid 134 remain open until the closing of the normally open contact of the limit switch 107 during the succeeding gauging operation.

Opening of the normally closed limit switches 62, 64 and 66 interrupts the circuits of the coils of the relays 151, 152 and 153 which were completed before by the closing of the limit switches 61, 63 and 65 and of the normally open contacts 154, 155 and 156. As a result of the interruption, the normally closed contacts 158, 160 and 162 are reclosed so as to tend to complete the circuit of the coils of the solenoids 133 and 134.

During the continuation of the advancement of the pusher 73, carrying the second receiver magnet 12 from the gauging position to the discharge end of the channel 36, the L-shaped arm 91 engages the roller plunger 92 of the limit switch 93 to close the latter so as to further tend to complete the circuit of the coils of the solenoids 133 and 134. However, since the normally open contact 147 of the relay 144 in the circuit of the coil of the solenoid 134 is open, only the circuit of the coil of the solenoid 133 is completed. The energization of the coil of the solenoid 133 results in the withdrawal of the gate 118 from its normal, closed position, shown in FIGS. 3 and 7, to its operated open position, shown in FIG. 8.

Meanwhile, the pusher brings the second receiver magnet 12 to the discharge position over the discharge chute 11. The pusher 73 is then withdrawn in the manner described hereinabove with respect to the first receiver magnet 12, so that the second receiver magnet 12 is stripped off the head 74 and falls into the discharge chute 111. Since, at this time, the gate 118 is open, the second receiver magnet falls through the trap 116 upon the closed gate 119 and then rolls down the track 113 designed to guide the gauged receiver magnets 12—12, the outside diameter of which falls within the oversize grade, to a tote box (not shown) associated with the track 113.

The operation of the apparatus 11 then continues in the manner described with respect to the first receiver magnet, so that a third receiver magnet 12 depresses the detector arm 28, and the coil of the advance solenoid 101 is completed again. The air cylinder 87 then again causes the advancement of the piston rod 86 and, therefore, of the pusher 73.

Now it is assumed that the outside diameter of the third receiver magnet 12 to be gauged is less than the minimum acceptable outside diameter of the receiver magnets 12—12 included in the regular grade, i.e., that the third receiver magnet 12 is undersize. Then during the gauging operation, the third receiver magnet may not move the rollers 41—41 at all, or may move the rollers 41—41 distances insufficient to cause closing of any one or all of the limit switches 61, 63 and 65, and, therefore, insufficient to open the limit switches 62, 64 and 66.

As a result, the normally open contacts 146 and 147 will be closed after momentary closing of the normally open contact of the switch 107 and will remain closed throughout the operation related to the third receiver magnet 12. When the L-shaped arm 91 causes the closing of the limit switch 93, this results in the energization of the coils of both of the solenoids 133 and 134. Therefore, the solenoids 133 and 134 withdraw the gates 118 and 119 from their normal positions, shown in FIG. 3, so as to open both of the traps 116 and 117. The third receiver magnet 12, when stripped from the head 74, then falls through the traps 116 and 117 and rolls down the track 114, designed to guide the undersize receiver magnets 12—12 to a tote box associated with the track 114.

The gauging operation then is repeated in the manner described hereinabove, each time when the detector arm 28 is depressed by a receiver magnet 12 to be gauged.

It will be understood that the above-described arrangements are simply illustrative of the application of the principles of the invention. Other arrangements may be devised by those skilled in the art which will embody the principles of the invention and fall within the spirit and scope thereof.

What is claimed is:

1. Apparatus for gauging desired dimensional characteristics of articles, which comprises a gauging head having gauging means for measuring dimensional characteristics of articles, a pusher reciprocably movable relative to the gauging head for advancing an article into engagement with the gauging means, a stripper mounted on the pusher for limited slidable movement relative thereto, the pusher engaging the stripper operably during at least a portion of the reciprocable movement of the pusher for causing corresponding movement of the stripper with the pusher, and means for arresting the stripper during at least a portion of the retract stroke of the pusher so that, while the pusher moves relative to the arrested stripper, the stripper prevents the article from being retracted with the pusher thereby separating the article from the pusher.

2. Apparatus for gauging desired dimensional characteristics of articles, which comprises a gauging head, a pusher, the pusher being reciprocably movable relative to the gauging head between a position normally assumed by the pusher on one side of the gauging head and a discharge position on the opposite side of the gauging head to advance an article to be gauged through the gauging head to the discharge position, gauging means in the gauging head for measuring dimensional characteristics of the article as it is being advanced through the gauging head by the pusher, a stripper for separating the article from the pusher at the discharge position, the stripper and the pusher being mounted for limited relative slidable movement with respect to each other, means on the pusher for operatively engaging the stripper during at least a portion of each advance stroke of the pusher to cause corresponding movement of the stripper with the pusher, the stripper being engageable by the pusher during at least a portion of a retract stroke of the pusher for corresponding movement therewith, and means for resistively arresting the stripper during at least an initial portion of the retract stroke of the pusher so that while the pusher moves relative to the arrested stripper, the stripper prevents the article from being retracted with the pusher thereby separating the article from the pusher.

3. Apparatus for gauging outside diameter of cup-like articles, which comprises a gauging head, a pusher for feeding cup-like articles individually through the gauging head, the pusher being in the form of an elongated, stepped cylinder having a projecting nose portion adapted to fit an open end of a cup-like article to be gauged, the pusher being reciprocably movable between a position normally assumed by the nose portion of the pusher on one side of the gauging head and a discharge position on the opposite side of the gauging head to advance the article received on the nose portion of the pusher through the gauging head, gauging means in the gauging head for measuring the outside diameter of each article as it is being advanced through the gauging head by the pusher, a stripper for stripping the article off the nose portion of the pusher, the stripper and the pusher being mounted for limited relative slidable movement with respect to each other, means on the pusher for operatively engaging the stripper during at least a portion of each advance stroke of the pusher to cause corresponding advancement of the stripper with the pusher, the stripper being engageable by the pusher during at least a portion of a retract stroke of the pusher for causing corresponding movement therewith, and means for arresting the stripper at the discharge position during at least an initial portion of a retract stroke of the pusher so that, while the pusher moves relative to the arrested stripper, the stripper prevents the article from being retracted with the pusher thereby stripping the gauged article off the nose portion of the pusher.

4. Apparatus for gauging outside diameter of cup-like articles, which comprises a gauging head, a pusher for feeding cup-like articles individually through the gauging head, the pusher being in the form of an elongated, stepped cylinder having a projecting nose portion adapted to fit an open end of an article to be gauged, the pusher being reciprocably movable between a position normally assumed by the nose portion of the pusher on one side of the gauging head and a discharge position on the opposite side of the gauging head to advance the article received about the nose portion of the pusher through the gauging head, gauging means in the gauging head for measuring outside diameter of each article as it is fed through the gauging head by the pusher, a sleeve-like stripper having a stepped circular bore for accommodating the pusher slidably therein, the nose portion of the pusher at the normal position thereof being confined within the stripper, means for connecting the stripper and the pusher operatively during at least a portion of an advance stroke thereof to advance the stripper with the pusher, the pusher engaging the stripper operatively during at least a portion of a retract stroke of the pusher to retract the stripper therewith, and means for resistively arresting the movement of the stripper with the pusher to allow the nose portion of the pusher to intermittently move out of and into the normal confined positions thereof within the stripper during the respective initial portions of the advance and the retract strokes of the pusher so that the successive articles to be gauged are first received supportingly about the nose portion for advancement through the gauging head and then stripped off the pusher at the discharge position.

5. Apparatus for gauging outside diameter of cup-like articles, which comprises a gauging head having a passage through which articles to be gauged are fed individually, a pusher for feeding the articles individually through the gauging head, the pusher being in the form of an elongated, stepped cylinder having a projecting, enlarged head portion adapted to fit an open end of the article, means for moving the pusher reciprocably relative to the gauging head between a position normally assumed by the head portion of the pusher at one end of the passage and a discharge position at the opposite end of the passage, means for positioning the articles individually in the path of advance of the pusher from the normal position toward said one end of the passage so that the open end of the article faces the pusher and is substantially aligned axially therewith, the head portion of the pusher entering during an advance stroke thereof the open end of the article positioned by said positioning means at said one end of the passage to support the article about the head portion to advance the article through the gauging head, a plurality of gauging means mounted in the head intermediate said ends of the passage for measuring outside diameter of each article at predetermined spaced points thereabout as the article is fed through the gauging head by the pusher, a sleeve-like stripper mounted coaxially of the pusher, the stripper having a stepped circular bore for accommodating the pusher slidably therein, the head portion of the pusher in the normal position being confined within the stripper, means for connecting the stripper and the pusher operatively during at least a portion of an advance stroke thereof to advance the stripper with the pusher, the head portion engaging the stripper operatively during at least a portion of a retract stroke of the pusher to retract the stripper therewithin, the connecting means being so positioned with respect to the head portion as to allow a limited relative slidable movement of the stripper and the pusher with respect to each other, and means for resistively arresting the stripper so as to allow a limited slidable movement of the pusher relative to the arrested stripper so that the stripper is resistively arrested first in the normal position during an initial portion of the advance stroke of the pusher, so that the head portion of the pusher exits from the stripper a distance sufficient to supportingly receive the article thereabout for advancement first in engagement with the gauging means and then toward the discharge position, and then in the discharge position during an initial portion of a retract stroke of the pusher so that the head portion moves into the confined position within the stripper for stripping the gauged article off the head portion of the pusher.

6. Apparatus for gauging desired outside dimensions of articles and for automatically grading the articles according to the gauged outside dimensions, which comprises a gauging head through which articles to be gauged are fed individually, a plurality of rotatable roller means mounted in the gauging head radially of an imaginary central axis of the gauging head, two of the roller means being mounted stationary relative to said axis for supporting the individual articles in a desired orientation in a gauging position, the remaining roller means being mounted radially movable relative to said axis for measuring individually the desired outside dimensions of the consecutive articles, means for normally urging the movable roller means into respective normal positions thereof relative to said axis so that an article being fed substantially along said axis in engagement with and between the stationary roller means and the movable roller means, causes displacement of each movable roller means relative to the normal position thereof, the degree of displacement of each of the movable roller means being directly proportional to the respective measurements of the outside dimensions, a plurality of first switch means associated with the movable roller means, each of the switch means being responsive to at least a predetermined minimum displacement of the corresponding movable roller means, a plurality of second switch means also associated individually with the movable roller means, each of the second switch means being responsive to a displacement of the corresponding movable roller means greater than a prescribed maximum displacement, and means actuatable for indicating whether the gauged article is undersize, within limits or oversize, the first switch means being arranged to actuate the indicating means to indicate that the article is undersize when the displacement of at least one of the gauging means is less than said minimum displacement, the individual first switch means cooperating with each other in response to at least said minimum displacement of each one of the gauging means for actuating the indicating means to indicate that the dimensions of the article are within limits, the individual second switch means being arranged to neutralize the cooperation of the first switch means and to actuate the indicating means to indicate that displacement of at least one of the movable roller means is greater than the respective prescribed maximum displacement and the article is oversize.

7. Apparatus for gauging desired dimensional characteristics of articles and for automatically grading the articles according to the gauged dimensional characteristics, which comprises a gauging head having gauging means for gauging dimensional characteristics of articles, a pusher reciprocably movable relative to the gauging head for advancing an article in engagement with the gauging means, a stripper mounted on the pusher for limited slidable movement relative thereto, the pusher engaging the stripper operably during at least a portion of reciprocable movement of the pusher for causing corresponding movement of the stripper with the pusher, means for arresting the stripper during at least a portion of a retract stroke of the pusher so that, while the pusher moves relative to the arrested stripper, the stripper prevents the article from being retracted with the pusher thereby separating the article from the pusher, and means responsive to the gauging means for segregating consecutive articles after being separated from the pusher into at least an acceptable and a rejected grade in accordance with the gauged dimensional characteristic of each article.

8. Apparatus for gauging desired outside dimensions of articles and for automatically grading the articles according to measurements of the outside dimensions, which comprises a gauging head, a pusher, the pusher being reciprocably movable relative to the gauging head between a position normally assumed by the pusher on one side of the gauging head and a discharge position on the opposite side of the gauging head to advance an article to be gauged through the gauging head to the discharge position, a plurality of gauging means in the head for measuring outside dimensions of each article as it is fed through the gauging head by the pusher, the gauging means being mounted for relative movement with respect to each other in accordance with the measurements of the desired outside dimension, a stripper for separating the article from the pusher at the discharge position, the stripper and the pusher being mounted for limited relative slidable movement with respect to each other, means on the pusher for operatively engaging the stripper during at least a portion of each advance stroke of the pusher to cause corresponding movement of the stripper with the pusher, the stripper being engageable by the pusher during at least a portion of a retract stroke of the pusher for corresponding movement therewith, means for resistively arresting the stripper during at least an initial portion of the retract stroke of the pusher so that, while the pusher moves relative to the arrested stripper, the stripper prevents the article from being retracted with the pusher thereby separating the article from the pusher, and means responsive to the movement of the gauging means relative to each other for segregating consecutive articles separated from the pusher into at least an acceptable and a rejected grade in accordance with the respective measurements of each article.

9. Apparatus for gauging outside dimensions of articles and for automatically grading the articles according to measurements of the outside dimensions, which comprises a gauging head, a pusher, the pusher being reciprocably movable relative to the gauging head between a position normally assumed by the pusher on one side of the gauging head and a discharge position on the opposite side of the gauging head to advance an article to be gauged through the gauging head to the discharge position, support means mounted in the gauging head intermediate said one side and said discharge position for supporting the article in a desired orientation in a gauging position, gauging means normally biased resistively toward the support means and movable with respect to the support means in accordance with an instantaneous measurement of a desired outside dimension of the article, the gauging means being normally so positioned relative to the support means that an article having at least minimum acceptable outside dimensions causes at least a predetermined minimum displacement of the gauging means relative to the normal position thereof, a stripper for separating the article from the pusher at the discharge position, the stripper and the pusher being mounted for limited relative slidable movement with respect to each other, means on the pusher for operatively engaging the stripper during at least a portion of each advance stroke of the pusher to cause corresponding movement of the stripper with the pusher, the pusher engaging the stripper during at least a portion of a retract stroke of the pusher to cause corresponding movement of the stripper therewith, means for resistively arresting the stripper during at least an initial portion of the retract stroke of the pusher so that, while the pusher moves relative to the arrested stripper, the stripper prevents the gauged article from being retracted with the pusher thereby separating the gauged article from the pusher, and means responsive to preselected amounts of displacements of the gauging means for segregating consecutive articles separated from the pusher into at least an acceptable and a rejected grade in accordance with the respective measurements of each article.

10. Apparatus for gauging desired outside dimensions of articles and for automatically grading the articles according to measurements of the outside dimensions, which comprises a gauging head, a pusher, means for moving the pusher reciprocably between a position normally assumed by the pusher on one side of the gauging head and a discharge position on the opposite side of the gauging head to advance an article to be gauged through the gauging head to the discharge position, support means in the gauging head for supporting the article in a desired orientation in a proper gauging position, a plurality of movable gauging means for measuring individually at predetermined spaced points about the article the desired outside dimensions of the article, means for normally urging the gauging means into respective normal positions relative to the support means so that an article, having minimum acceptable outside dimensions causes a predetermined minimum displacement of each gauging means relative to the normal position thereof, the displacement of each of the gauging means being directly proportional to the respective gauged outside dimension, a plurality of first switch means associated individually with corresponding ones of the gauging means, each of the first switch means being responsive to at least said predetermined minimum displacement of the corresponding gauging means, a plurality of second switch means also associated individually with the gauging means, each of the second switch means being responsive to a displacement of the corresponding gauging means which is greater than a prescribed maximum displacement, a stripper mounted on the pusher for limited slidable movement relative thereto, means on the pusher for engaging the stripper during at least a portion of an advance stroke of the pusher for causing corresponding movement of the stripper with the pusher, the pusher engaging the stripper during at least a portion of a retract stroke thereof for causing corresponding movement of the stripper with the pusher, means for resistively arresting the movement of the stripper with the pusher so that, while the pusher moves relative to the arrested stripper, the stripper prevents the article from being retracted with the pusher thereby disengaging the gauged article from the pusher, and means actuatable by the first and second switch means in accordance with the respective measurements of the outside dimensions of each article for grading the disengaged articles as undersize, within limits or oversize, the first switch means being arranged to actuate the grading means to grade the discharged article as undersize when the displacement of at least one of the gauging means is less than said minimum displacement, the individual first switch means cooperating with each other in response to said minimum displacement of each one of the gauging means for actuating the grading means to grade the article as within limits, the individual second switch means being arranged to neutralize the cooperation of the first switch means and to actuate the grading means in response to a displacement of at least one of the gauging means which is greater than the respective prescribed maximum displacement to grade the article as oversize.

11. Apparatus for gauging dimensions of outside diameter of cup-like articles and for automatically grading the articles according to the measured dimensions, which comprises a gauging head having a passage through which articles to be gauged are fed individually, a pusher in the form of an elongated, stepped cylinder having a projecting, enlarged nose portion adapted to fit an open end of an article, means for moving the pusher reciprocably relative to the gauging head between a position normally assumed by the nose portion of the pusher at one end of the passage and a discharge position at the opposite end of the passage, means for positioning the articles individually at said one end of the passage in the path of advance of the pusher so that the open end of the article faces the pusher and is substantially aligned axially therewith, the nose portion of the pusher during an advance stroke thereof entering the open end of the aligned article to supportingly receive the article thereabout and to advance the article through the gauging head, support means mounted intermediate of said ends of the passage for supporting an article being fed through the gauging head in a desired orientation in a gauging position, gauging means normally biased resistively toward the support means and movable with respect to the support means in accordance with measurements of the dimension of outside diameter of the article, the gauging means being normally so positioned relative to the support means that an article having at least a minimum acceptable outside diameter causes at least a predetermined minimum displacement of the gauging means relative to the normal position thereof, the displacement of the gauging means being proportional to the respective dimension of the article, a sleeve-like stripper mounted coaxially of the pusher, the stripper having a stepped circular bore for accommodating the pusher slidably therein, the nose portion of the pusher in the normal position being confined in the stripper, connecting means for removably connecting the stripper and the pusher operatively during an advance stroke thereof to advance the stripper with the pusher, the nose portion engaging the stripper operatively during at least a portion of the retract stroke of the pusher to retract the stripper therewith, the connecting means being so positioned with respect to the nose portion as to allow a limited relative slidable movement of the stripper and the pusher with respect to each other, means for resistively arresting the stripper to allow a limited slidable movement of the pusher, relative to the arrested stripper so that the stripper is intermittently arrested first in the normal position during an initial portion of the advance stroke of the pusher, so that the nose portion of the pusher exits from the stripper a distance sufficient to supportingly receive the article thereabout for advancement first in engagement with the support means and the gauging means and then toward the discharge position, and then in the discharge position during an initial portion of a retract stroke of the pusher, so that the nose portion moves into the confined position within the stripper for stripping the gauged article off the nose portion of the pusher, sorting means actuatable for grading the gauged articles at least acceptable or rejected, and electrical switch means responsive to the displacement of the gauging means for actuating the sorting means in accordance with measurements of the outside dimensions of the article, the outside diameter of the stripper being such that the stripper causes displacement of gauging means which is less than said predetermined displacement to avoid inaccurate grading of articles in response to the movement of the stripper past the gauging means.

12. In apparatus for gauging outside diameter of cup-like articles, wherein the articles are gauged individually in a gauging head having means for measuring outside diameter of each article as it is fed through the gauging head, the improvement which comprises a pusher for feeding cup-like articles individually through the gauging head, the pusher being in the form of an elongated, stepped cylinder having a projecting nose portion adapted to fit an open end of an article to be gauged, the pusher being reciprocably movable between a position normally assumed by the nose portion of the pusher on one side of the gauging head and a discharge position on the opposite side of the gauging head to advance the article received about the nose portion of the pusher through the gauging head, a sleeve-like stripper having a stepped circular bore for accommodating the pusher slidably therein, the nose portion of the pusher at the normal position thereof being confined within the stripper, connecting means for operatively connecting the stripper and the pusher during at least a portion of an advance stroke thereof to advance the stripper with the pusher, the pusher engaging the stripper operatively during at least a portion of a retract stroke of the pusher to retract the stripper therewith, and means for resistively arresting the movement of the stripper with the pusher to allow the nose portion of the pusher to intermittently move out of and into the normal confined positions thereof within the stripper during the respective initial portions of the advance and the retract strokes of the pusher so that the successive articles to be gauged are first received supportingly about the nose portion for advancement through the gauging head and then stripped off the pusher at the discharge position.

13. In apparatus for gauging outside diameter of cup-like articles, wherein the articles are gauged individually in a gauging head, the gauging head having a passage through which articles to be gauged are fed individually and a plurality of gauging means mounted intermediate the ends of the passage transversely thereof for measuring outside diameter of each article as it is fed through the gauging head, the improvement which comprises a pusher for feeding the articles individually through the gauging head, the pusher being in the form of an elongated, stepped cylinder having a projecting, enlarged head portion adapted to fit an open end of the article, means for moving the pusher reciprocably relative to the gauging head between a position normally assumed by the head portion of the pusher at one end of the passage and a discharge position at the opposite end of the passage, means for positioning the articles individually in the path of advance of the pusher from the normal position toward said one end of the passage so that the open end of the article faces the pusher and is substantially aligned axially therewith, the head portion entering during an advance stroke of the pusher the open end of the article positioned by said positioning means at said one end of the passage to receive supportingly the article about the head portion to advance the article through the gauging head, a sleeve-like stripper mounted coaxially of the pusher, the stripper having a stepped circular bore for accommodating the pusher slidably therein, the head portion of the pusher in the normal position being confined in the stripper, connecting means for operatively connecting the stripper and the pusher during at least a portion of an advance stroke thereof to advance the stripper with the pusher, the head portion of the pusher engaging the stripper operatively during at least a portion of a retract stroke of the pusher to cause retraction of the stripper with the pusher, the connecting means being so positioned with respect to the head portion as to allow a limited relative slidable movement of the stripper and the pusher with respect to each other, and means for resistively arresting the stripper so as to allow a limited slidable movement of the pusher relative to the arrested stripper so that the stripper is resistively arrested first in the normal position during an initial portion of the advance stroke of the pusher, so that the head portion of the pusher exits from the stripper a distance sufficient to supportingly receive the article thereabout for advancement first in engagement with the gauging means and then toward the discharge position, and then in the discharge position during an initial portion of a retract stroke of the pusher so that the head portion moves into the confined position within the stripper for stripping the gauged article off the head portion of the pusher.

References Cited in the file of this patent

UNITED STATES PATENTS

| | | |
|---|---|---|
| 1,771,097 | Raule | July 22, 1930 |
| 2,542,090 | Lorenz | Feb. 20, 1951 |
| 2,975,894 | Hill | Mar. 21, 1961 |